(12) United States Patent
Lee

(10) Patent No.: US 6,385,435 B1
(45) Date of Patent: May 7, 2002

(54) COUPLED INTERFERENCE CONCELLATION SYSTEM FOR WIDEBAND REPEATERS IN A CELLULAR SYSTEM

(76) Inventor: Jhong Sam Lee, 451 Hungerford Dr., Suite 609, Rockville, MD (US) 20850

( * ) Notice: Subject to any disclaimer, the term of this patent is extended or adjusted under 35 U.S.C. 154(b) by 0 days.

(21) Appl. No.: 09/552,882

(22) Filed: Apr. 20, 2000

(51) Int. Cl.[7] .................................................. H04B 7/14
(52) U.S. Cl. ........................ 455/24; 455/63; 455/278.1
(58) Field of Search ............................ 455/11.1, 17, 21, 455/24, 63, 277.2, 278.1, 279.1, 295, 296; 375/349, 351

(56) References Cited

U.S. PATENT DOCUMENTS

| | | |
|---|---|---|
| 4,383,331 A | 5/1983 | Davidson |
| 4,475,243 A | 10/1984 | Batlivala et al. |
| 4,701,935 A | 10/1987 | Namiki |
| 4,789,993 A | 12/1988 | Ryu |
| 5,125,108 A | 6/1992 | Talwar |
| 5,584,065 A | 12/1996 | Monzello |
| 5,835,848 A | * 11/1998 | Bi et al. ........................ 455/24 |
| 5,963,847 A | * 10/1999 | Ito et al. ........................ 455/24 |

* cited by examiner

*Primary Examiner*—Thanh Cong Le
(74) *Attorney, Agent, or Firm*—Banner & Witcoff, LTD

(57) ABSTRACT

A coupled interference cancellation system (CICS) for canceling retransmission-antenna-to-receiving-antenna (coupled) interference signals. The system is connected to a bidirectional, over-the-air repeater for a wideband digital cellular communication system. For each repeater direction, the CICS injects one or more modulated pilot signals at the retransmission antenna input which are emitted along with the communications signal. The portion of the repeater output signal that is coupled to the receiving antenna is indicated by the properties of the pilot signals that are detected at the repeater's receiving antenna. The detected quadrature components of the pilot signals are used to generate a cancellation signal by vector modulation and delay of a sample of the retransmission antenna input. The cancellation signal is applied at the receiving antenna output to subtract the coupled interference.

8 Claims, 9 Drawing Sheets

COUPLED INTERFERENCE CONCELLATION SYSTEM FOR WIDEBAND REPEATERS IN A CELLULAR SYSTEM

FIELD OF THE INVENTION

The present invention relates to cellular radio communication systems in which over-the-air repeaters are used to improve signal coverage. More specifically, the present invention relates to the cancellation of interference arising from unwanted coupling between the repeater antennas.

In a cellular system, connections to a public switched telephone network (PSTN) are provided to mobile and handheld telephone subscribers by means of radio transmissions to and from a base station and the subscriber units. In some subscriber locations within the base station's coverage area (also known as a cell), the radio signals may be severely attenuated by natural or manmade obstructions, thus rendering the transmissions too weak to be used. The areas in which the transmissions are too weak may be in a "shadow zone" caused by a hill or building in the path of the transmissions, as illustrated in FIG. 1. These areas may also be inside a building or underground, such as in a shopping mall or subway station.

It is well known in the practice of cellular engineering that the signals to and from a shadow zone can be "boosted" using a device known as a "repeater." The basic configuration of an over-the-air repeater is shown in FIG. 2. In principle, forward link signals from the base station to subscriber units are received by one repeater antenna 200 (the "donor" antenna), are amplified, are retransmitted by a second repeater antenna 210 (the "service" or "reradiation" antenna), and are received only at the subscriber units. Similarly, in principle, reverse link signals from the subscriber units to the base station (whose frequencies are different from those of the forward link signals) are received by the repeater's service antenna, are amplified, are retransmitted by the repeater's donor antenna, and are received only at the base station. The use of a repeater to improve cellular coverage in a shadow zone within the coverage area of a base station is illustrated in FIG. 3. A repeater may also be employed to extend the coverage area of a base station as illustrated in FIG. 4. The signals that are retransmitted by the repeater into the shadow zone or extended coverage area are at the same frequencies as those received by the repeater from the base station.

In practice, in both the forward and reverse signal paths there is a finite amount of transmitted energy that is fed back (coupled) to the respective receiving antennas, due to reflections or to imperfections in the antenna radiation patterns, thereby producing interference at the respective antennas. The amount of such coupled interference is highly dependent on the antennas' relative positions and orientations, as well as the general propagation environment near the repeater. The isolation between the repeater antennas is defined as the measure of the retransmission output power to the coupled input power, usually expressed in decibel (dB) units. Since there is feedback (coupled interference) in the repeater system, there is the possibility of oscillation under certain conditions. To prevent oscillation, the amount of repeater gain must be no more than the isolation between the antennas. In a repeater system where the isolation is much greater than the repeater gain, the possibility of oscillation is very much diminished. One way to accomplish this objective is to reduce the amount of the coupled interference.

The present invention is intended to reduce the coupled interference signals that appear at the repeater inputs. For a bidirectional repeater, as shown in FIG. 5, two cancellation systems are required—one for each direction.

Description of the Prior Art

With reference to interference cancellation using external samples, U.S. Pat. Nos. 5,125,108 and 5,584,065, disclose methods are removing interfering signals that are present along with the desired communications signal at the antenna of a communications receiver, assuming that a sample of the interfering signal is available at a separate, auxiliary antenna. In these references, adaptive techniques are employed to adjust the amplitude and phase of the sample of the interfering signal so that, when it is combined with the output of the communication system's receiving antenna, the interfering signal is cancelled. The means for adjusting the amplitude and phase of the sample of the interfering signal in the cited patents is a circuit known as a vector modulator, which is described in a later section of this disclosure.

With regards to the cancellation of coupled interference in repeaters using baseband regeneration U.S. Pat. No. 4,475,243 describes an apparatus is described for minimizing the "spillover" signal from the transmitter to the receiver in a repeater. In this reference, the received signal is translated to baseband (i.e., the carrier modulation is removed) for amplification (regeneration), then translated back up to the same carrier frequency (i.e., remodulated by a carrier) for retransmission. The system described in this cited patent applies to a single communication signal with narrowband analog voice modulation, and it utilizes an "injection signal" based on sampling the regenerated communication signal in conjunction with mixing and correlation techniques to isolate the spillover component of the input signal so that it can be removed at an intermediate frequency (IF) stage of the receiver.

Furthermore, in U.S. Pat. Nos. 4,701,935 and 4,789,993, a digital microwave radio repeater is described in which the desired digital signal is a single signal and is regenerated (amplified) at baseband. In these references, the transmitter-to-receiver coupled interference component that appears at baseband is canceled by subtracting an estimated baseband interference signal. The estimated baseband interference signal is produced by means of an equalization technique implemented by transversal filters whose characteristics are adaptively determined.

With regards to the cancellation of coupled interference in repeaters not using baseband regeneration, U.S. Pat. No. 4,383,331 adds a repeater a "tag" to the modulation of a desired analog voice signal prior to its retransmission. The unwanted reception of the repeater output signal at its input, as coupled or otherwise repeated interference, is detected at the repeater as one or more versions of the desired signal at the repeater input that contain the tag in their modulation. In this reference, the strengths of the interference components at the repeater input are separately measured and this information allows the repeater to subtract out the interference.

Furthermore, in U.S. Pat. No. 5,835,848, multiple wideband signals, as in a code-division multiple access (CDMA) wireless system, are received as desired signals at a repeater's input antenna, along with coupled interference. In this reference, the repeater circuitry contains a means for canceling the coupled interference by subtracting a delayed and amplitude- and phase-adjusted version of the desired signal at the repeater output antenna. The coupling delay is assumed to be known and the degree of phase and amplitude adjustment that is necessary to perform the cancellation is determined by a calibration procedure. The calibration procedure consists of the steps of:

a. waiting for a period of time when there is no repeater input signal;

b. transmitting a test (pilot) signal in the absence of any desired signal;

c. measuring the characteristics of the portion of the test signal that is coupled from the repeater's output to its input; and d. if the desired signal is continuous, interrupting the desired signal briefly at some periodic interval in order to transmit and measure the amount of coupled test signal. In these references, the cancellation signal is a delayed and adjusted version of the repeater output signal, which is the source of the coupled interference, where the amount of interference is estimated by measuring a "tagged" input interference component (as in U.S. Pat. No. 4,383,331) or a test signal-only transmission (as in U.S. Pat. No. 5,835,848).

SUMMARY OF THE INVENTION

The object of the present invention is to provide a method and a circuit for canceling interference that is coupled from a wideband repeater output antenna to its input antenna. In particular, with regards to interference cancellation using external samples, the present invention applies to the situation in which the interfering signal that is present at the antenna simultaneously with the desired communications signal is a delayed and attenuated version of the communications signal itself, and a sample of this interfering signal is not available at an auxiliary antenna. Moreover, the interfering signal in the application for which the present invention pertains is practically indistinguishable from the desired signal except for a time delay. Therefore, the present invention provides for the injection of pilot signals at the repeater output antenna as a form of known, intentional interference that is easily distinguished and removed, and that facilitates the cancellation of the interfering signal which arrives at the repeater input antenna by the same path as the pilot signals.

With regards to the cancellation of coupled interference in repeaters using baseband regeneration, the present invention applies to a situation in which baseband regeneration is not possible because the desired signal is in general a wideband combination of multiple cellular signals that cannot be isolated from each other for demodulation and remodulation at the repeater.

Further, the present invention does not require any mixing, as in U.S. Pat. No. 4,475,243 to generate intermediate frequencies in the system; instead, the present invention operates at the original radio frequency (RF) of signal being repeated.

The present invention is also a technique in which one or more modulated pilot signals are used to control cancellation operations at different portions of a wideband spectrum that may contain multiple cellular carrier signals.

Lastly, present invention, the transmitter-to-receiver interference is cancelled through the technique of measuring the phase and amplitude of the pilot signals in order to control cancellation circuitry operating directly at the input and output radio frequencies (RF).

Furthermore, with regards to the cancellation of coupled interference in repeaters not using baseband regeneration, according to the present invention the desired signal is not modulated or interrupted by the technique of the present invention; instead, one or more continuous pilot signals are added to the repeater output signal to provide for a measurement of the coupled interference, simultaneously with the normal processing of the repeater input signal. Also, the present invention uses more than one pilot signal, at different frequencies, to enhance the effectiveness of the CICS over a wide bandwidth.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written disclosure focuses on disclosing example embodiments of this invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF THE PREFERRED EMBODIMENT

Figure 1:
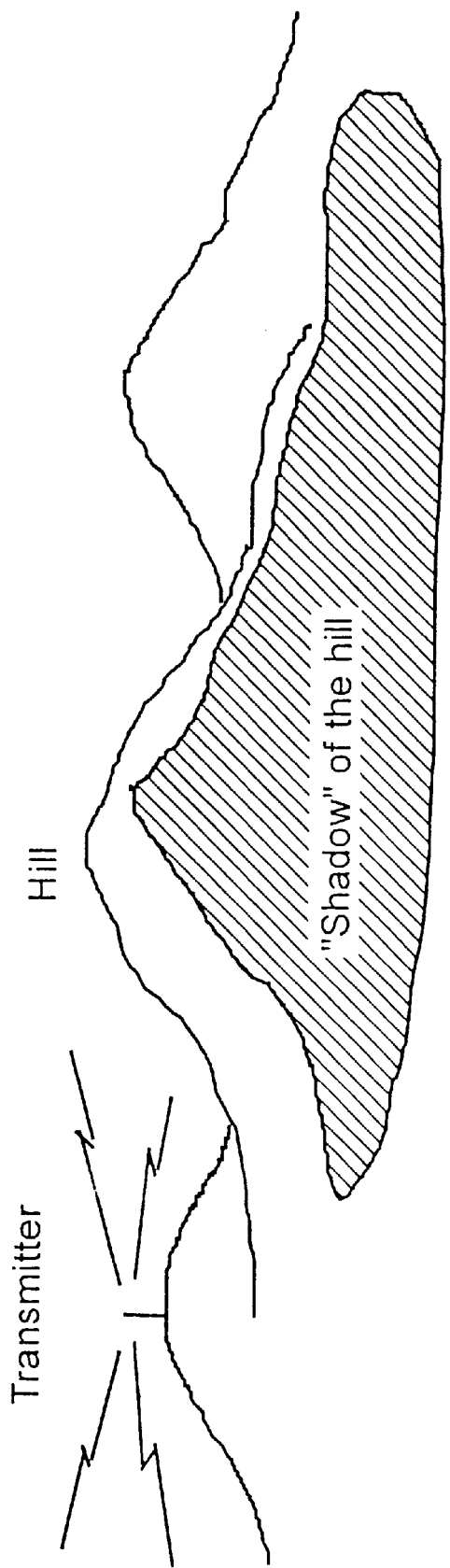
FIG. 1 illustrates a shadow zone caused by a natural obstacle in the radio transmission path of a cellular system.
Figure 2:
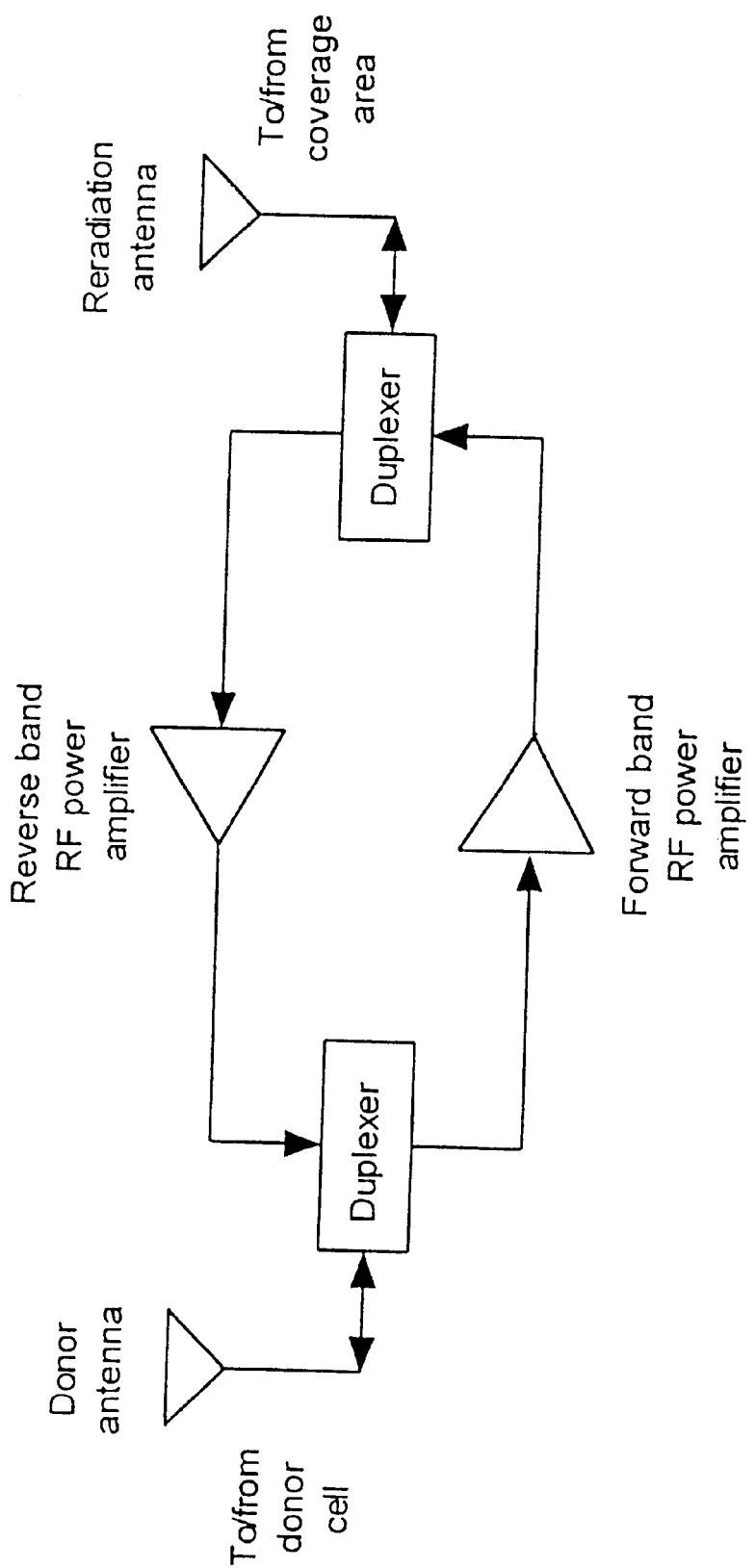
FIG. 2 illustrates the concept of a repeater used in a cellular system.
Figure 3:
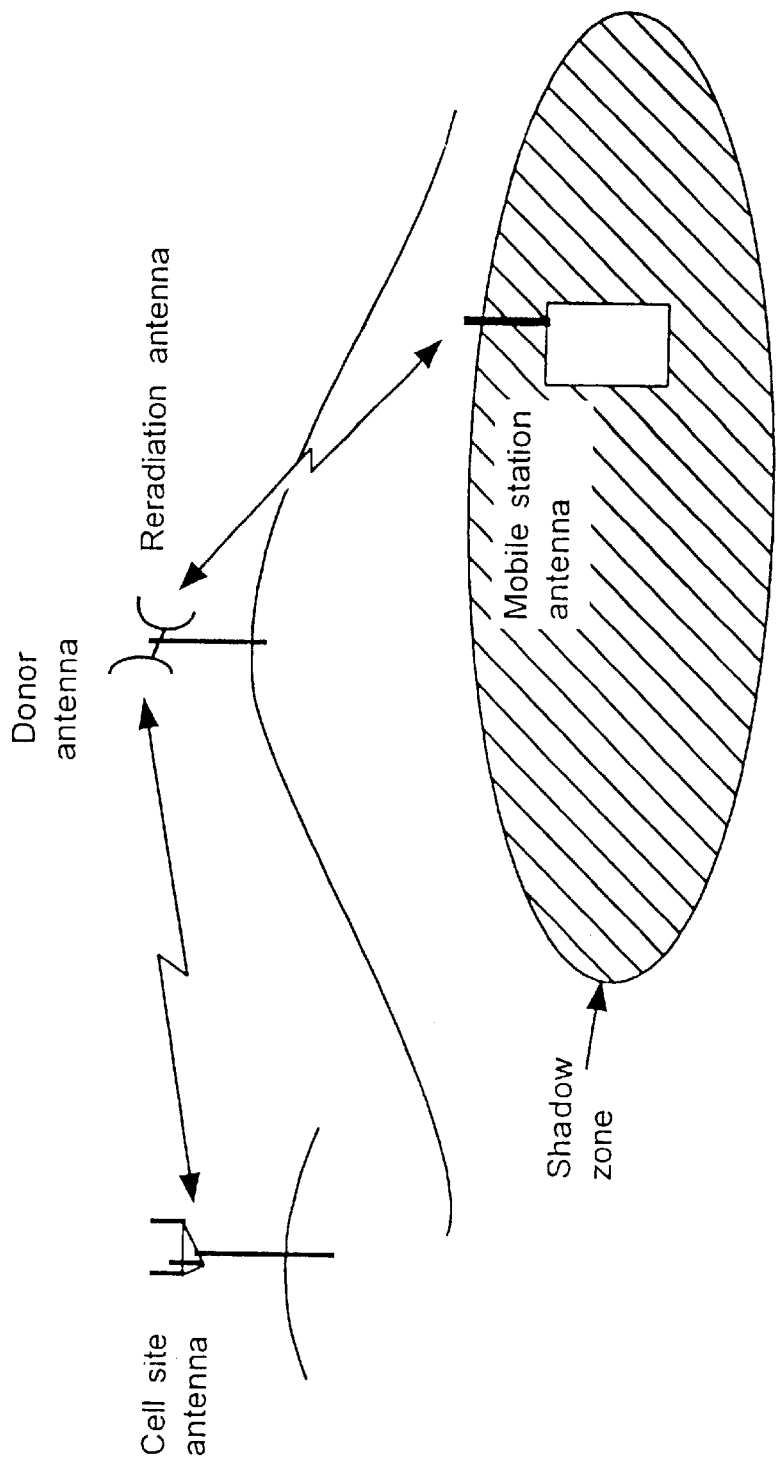
FIG. 3 illustrates the use of a repeater to improve cellular coverage in a shadow zone.
Figure 4:
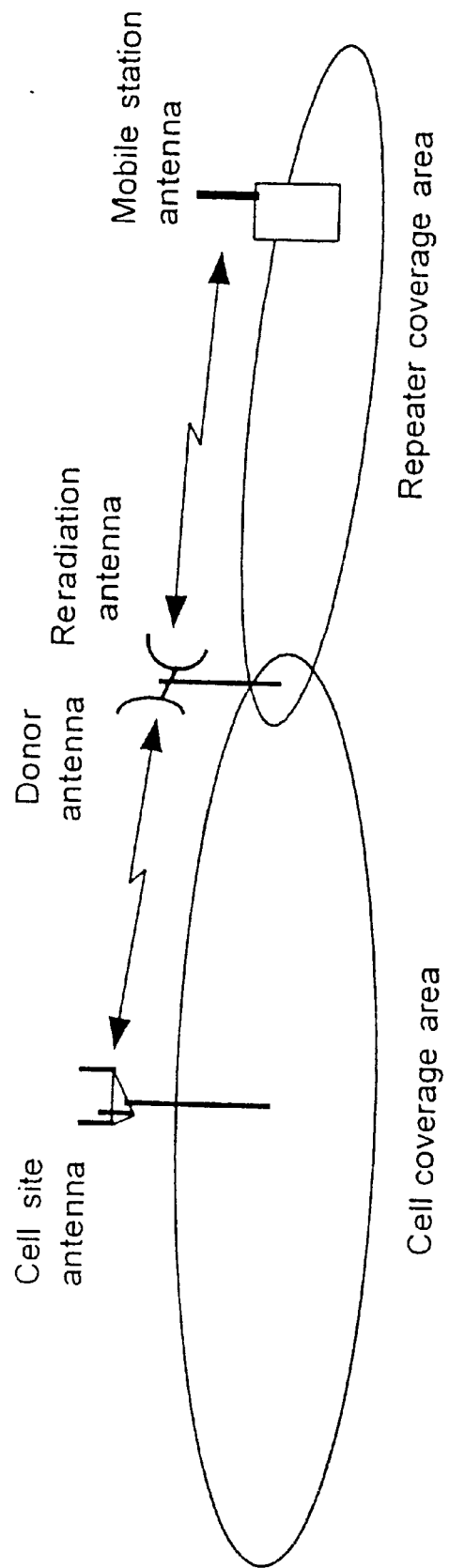
FIG. 4 illustrates the use of a repeater to extend the coverage area of the base station.
Figure 5:
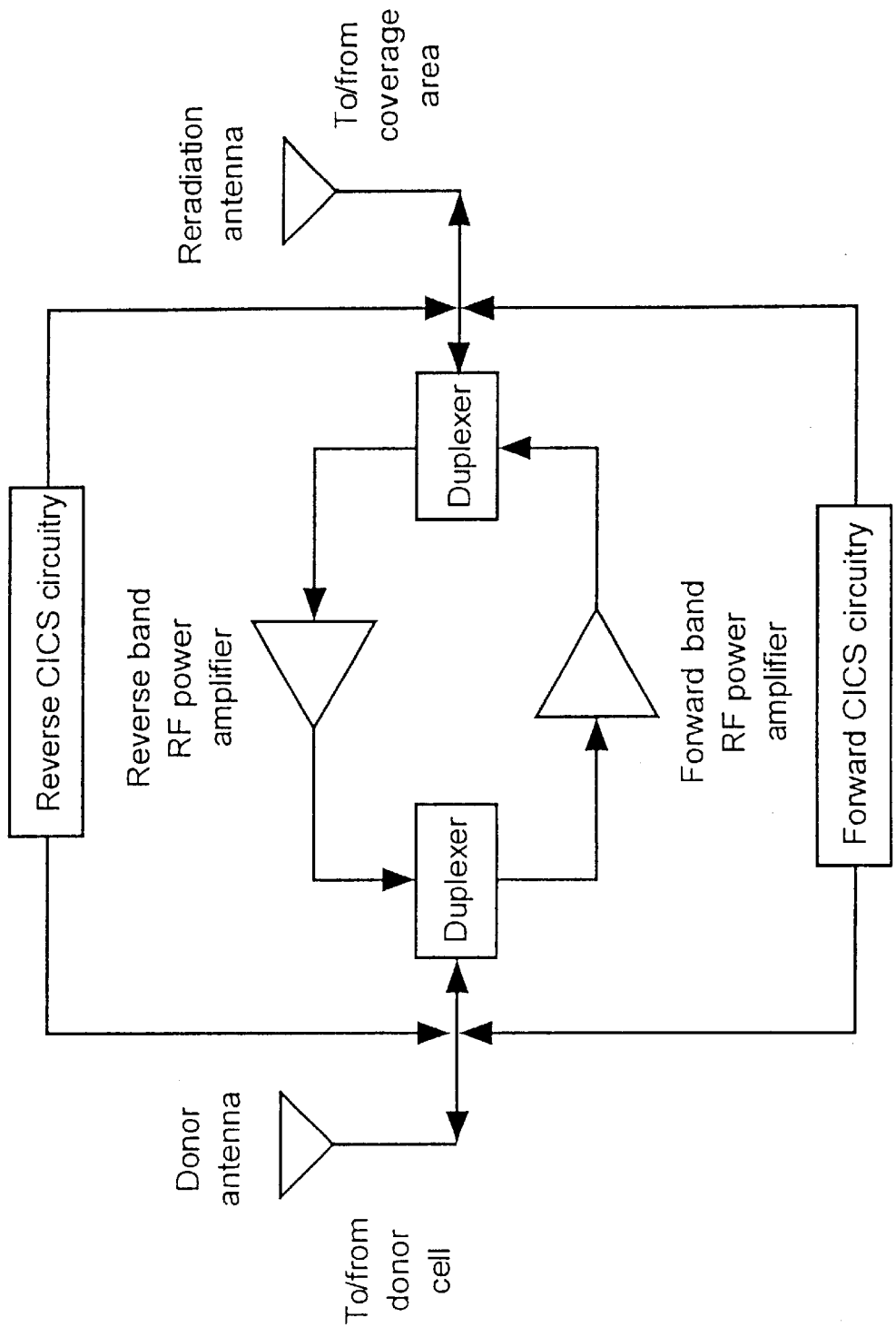
FIG. 5 is a block diagram illustrating the concept of a coupled interference cancellation system for a repeater.

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

Figure 6:
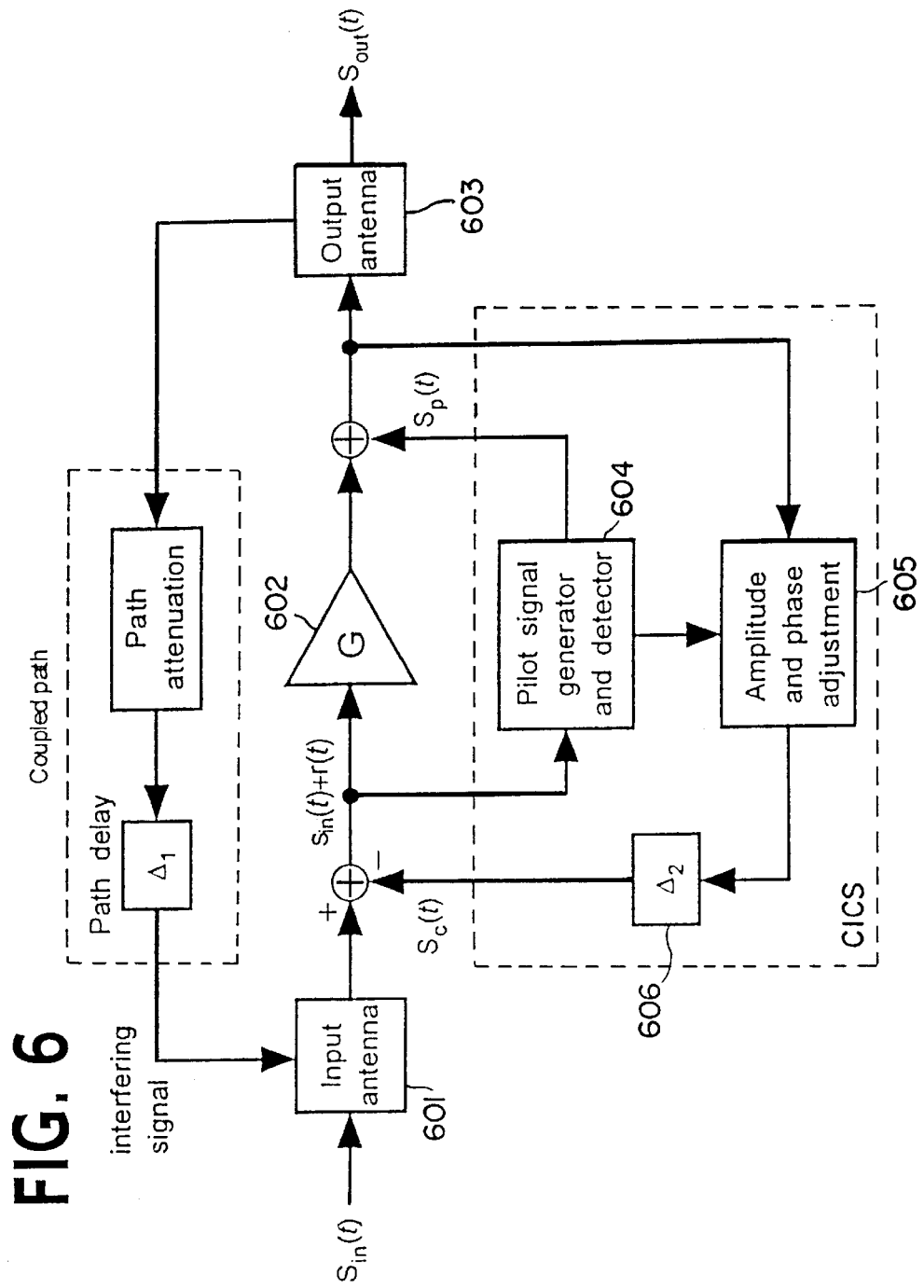
FIG. 6 is a block diagram of a coupled interference cancellation system for one direction of a repeater.

A block diagram of the circuitry of a coupled interference cancellation system (CICS) for one direction of a repeater is shown in FIG. 6, where the total system includes the input antenna (601), the repeater amplifier system (602), the output antenna (603), and the CICS circuitry. The CICS circuitry consists of a pilot signal generator and detector (604), an amplitude and phase adjustment circuit (605), and a delay line (606).

The repeater receives the input signal, designated as $s_{in}(t)$ in FIG. 6, amplifies it, and retransmits it. Without coupled interference, the output signal, designated as $s_{out}(t)$ in FIG. 6, is identical to the input signal, except that it has been amplified. However, some of the energy from the output antenna follows a "coupled path" back to the input antenna, appearing there as an interfering signal that is an attenuated and delayed version of the repeater output signal, where the delay in the coupled path is designated by $\square_1$ in FIG. 6.

The CICS depicted in FIG. 6 includes a pilot signal generator and detector (604) to detect the presence of a coupled interference signal. The pilot signal, designated as $s_p(t)$ in FIG. 6, is added to the repeater amplifier output and becomes part of the output signal. The degree of coupled interference is indicated by the detected strength of the attenuated and delayed version of the pilot signal, which is part of the residual signal, r(t), at the input to the repeater amplifier. The parameters of the detected pilot signal control an amplitude and phase adjustment circuit (605). This circuit, known as a vector modulator, is employed to change the amplitude and phase of the repeater output signal to match those of the interfering signal. Because the interfering signal is a delayed version of the output signal, it is necessary to delay the output of the amplitude and phase adjustment circuit (605) to produce the cancellation signal, designated $s_c(t)$ in FIG. 6, using a delay line (606) that implements a delay that is designated as $\square_2$. The amplitude and delay of the cancellation signal match those of the interfering signal, so that the interfering signal is canceled.

The CICS scheme of the present invention, as diagrammed in FIG. 6, automatically scales the cancellation signal in order to subtract the pilot signal(s) at the repeater input. In this invention, sinusoidal pilot signals are multiplied by a low frequency squarewave to further distinguish the pilot signals. The resulting modulated pilot signals are narrowband phase-shift-keying signals and are easily distinguished from the cellular signal; their low power minimizes interference with the cellular signal.

Figure 7:
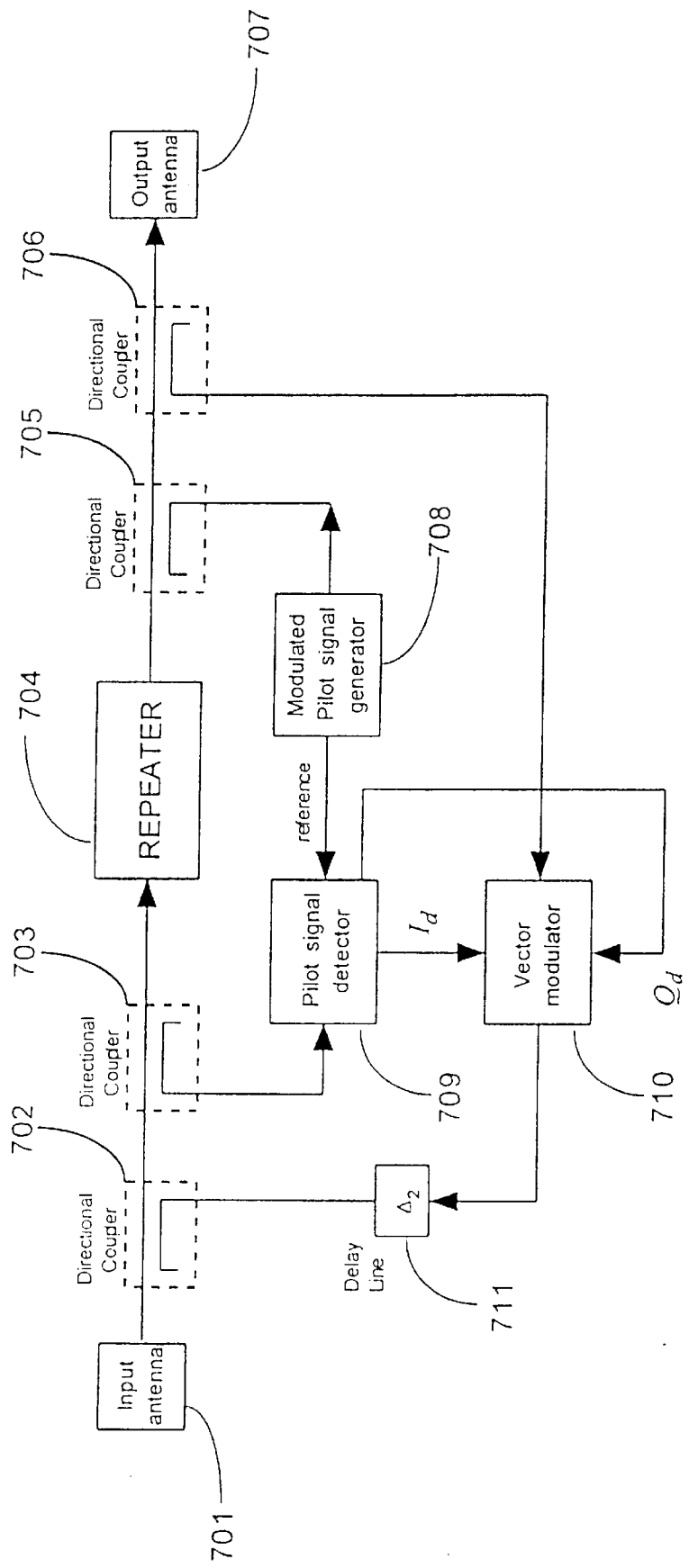
FIG. 7 is a diagram of the preferred embodiment of the coupled interference cancellation system for one direction of a repeater.

A preferred embodiment for the coupled interference cancellation system (CICS) for one direction of a repeater is diagrammed in FIG. 7. In the embodiment shown, one pilot signal is used. An embodiment using two pilot signals is discussed below.

In the system diagrammed in FIG. 7, the wideband cellular signals originate either from the base station (in the case of the forward link) or from one or more mobiles (in the case of the reverse link). The wideband cellular signals are received at the repeater site by the respective input antenna (701), amplified by the repeater's respective amplifier (704), and retransmitted by the respective output antenna (707). A modulated pilot signal generator (708) injects a pilot signal at the repeater output by means of a directional coupler (705). Some of the injected pilot signal's energy is coupled to the repeater input. A sample of the portion of the repeater output signal that is coupled to the repeater input (including the pilot signal) is obtained by means of a directional coupler (703). A quadrature pilot signal detector (709) extracts the in-phase and quadrature components of this coupled pilot signal. The quadrature components of the detected pilot signal, designated $I_d$ and $Q_d$ in FIG. 7, govern the operation of a vector modulator (710) that modifies the amplitude and phase of a sample of the repeater output communications-plus-pilot signal that is obtained by means of a directional coupler (706). The signal thus obtained is delayed by a delay line (711) that is calibrated to match the coupled path delay. Following this delay the resultant signal is applied to the input of the repeater through a directional coupler (702) as a cancellation signal.

The vector modulator (710) is a circuit that effects a phase shift of a signal in combination with a change in its envelope. With the control inputs $I_d$ and $Q_d$ in FIG. 7, the envelope of the signal applied to the vector modulator is multiplied by the amount a, where $$a=([I_d]^2+[Q_d]^2)^{1/2} \quad (1)$$

and its carrier phase is shifted by the angle θ, where $$\tan\theta=Q_d/I_d. \quad (2)$$

The output of the vector modulator is delayed by the coupled path delay $\Delta_2$ (711), then is subtracted from the repeater input signal to cancel the coupled interference. The delay is implemented using a section of coaxial cable that is cut to the appropriate length. The closed loop operation of the cancellation system automatically determines the precise phase and amplitude adjustment that results in a cancellation of the injected pilot signal that is coupled to the repeater input. The subtraction of the cancellation signal from the repeater input also results in significant reduction of the coupled cellular signal that is present at the repeater input.

Figure 8:
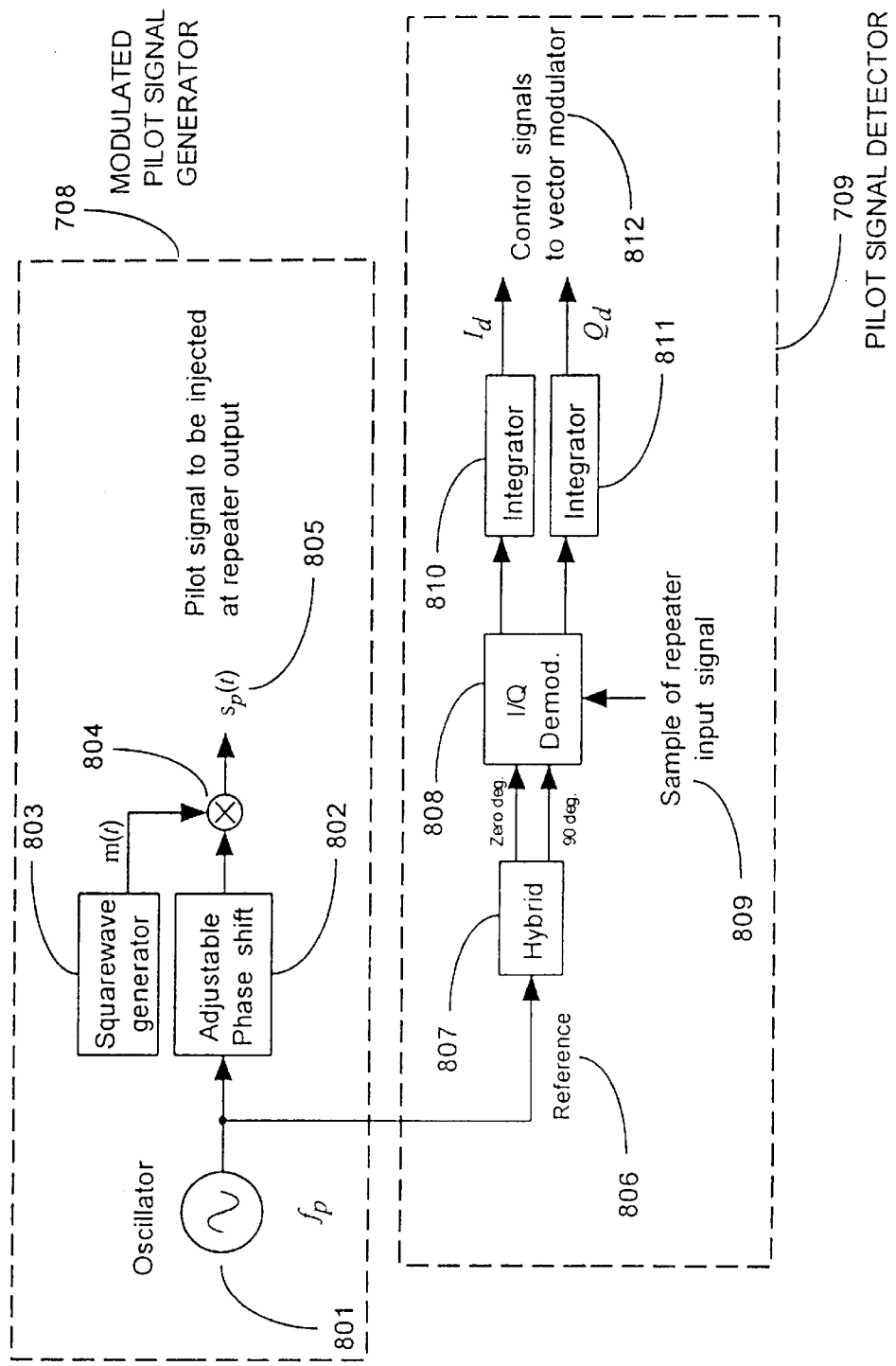
FIG. 8 is a diagram of the preferred embodiment of the generator and detector for a pilot signal.

The form of the modulated pilot signal injected at the repeater output is given by $$s_p(t)=A\, m(t)\cos\omega_p t, \quad (3)$$

$$m(t)=+1 \text{ or } -1, \quad (4)$$

where $\omega_p=2\pi f_p$ is the angular frequency of the pilot carrier and the period of the square wave m(t) is large compared to the delay in the coupled path. The preferred embodiment of the generation and detection circuitry for this pilot signal is diagrammed in FIG. 8. An oscillator (801) generates a sinusoid at the selected carrier frequency, which becomes the reference signal (806) for the detection circuit. The oscillator output is shifted by an adjustable phase-shifting circuit (802) that is calibrated during the repeater installation. The phase-shifted oscillator output is combined with the output of a squarewave generator (803), running at a low rate, using a multiplier (804). The modulated pilot signal thus formed (805) is injected at the repeater output as described previously. The reference signal (806) is split into zero-degree and 90-degree quadrature oscillator reference signals using a hybrid (807), and these quadrature oscillator signals are separately heterodyned with a sample of the repeater input signal (809) in a conventional I/Q (quadrature) detector (808) in order to detect the portion of the pilot signal that is present at the repeater input. The two outputs of the I/Q demodulator are separately processed by integrators (810) and (811) to form the signals (812) that are used to control the vector modulator. The vector modulator implements the amplitude and phase adjustment of the sampled output signal as described previously.

Figure 9:
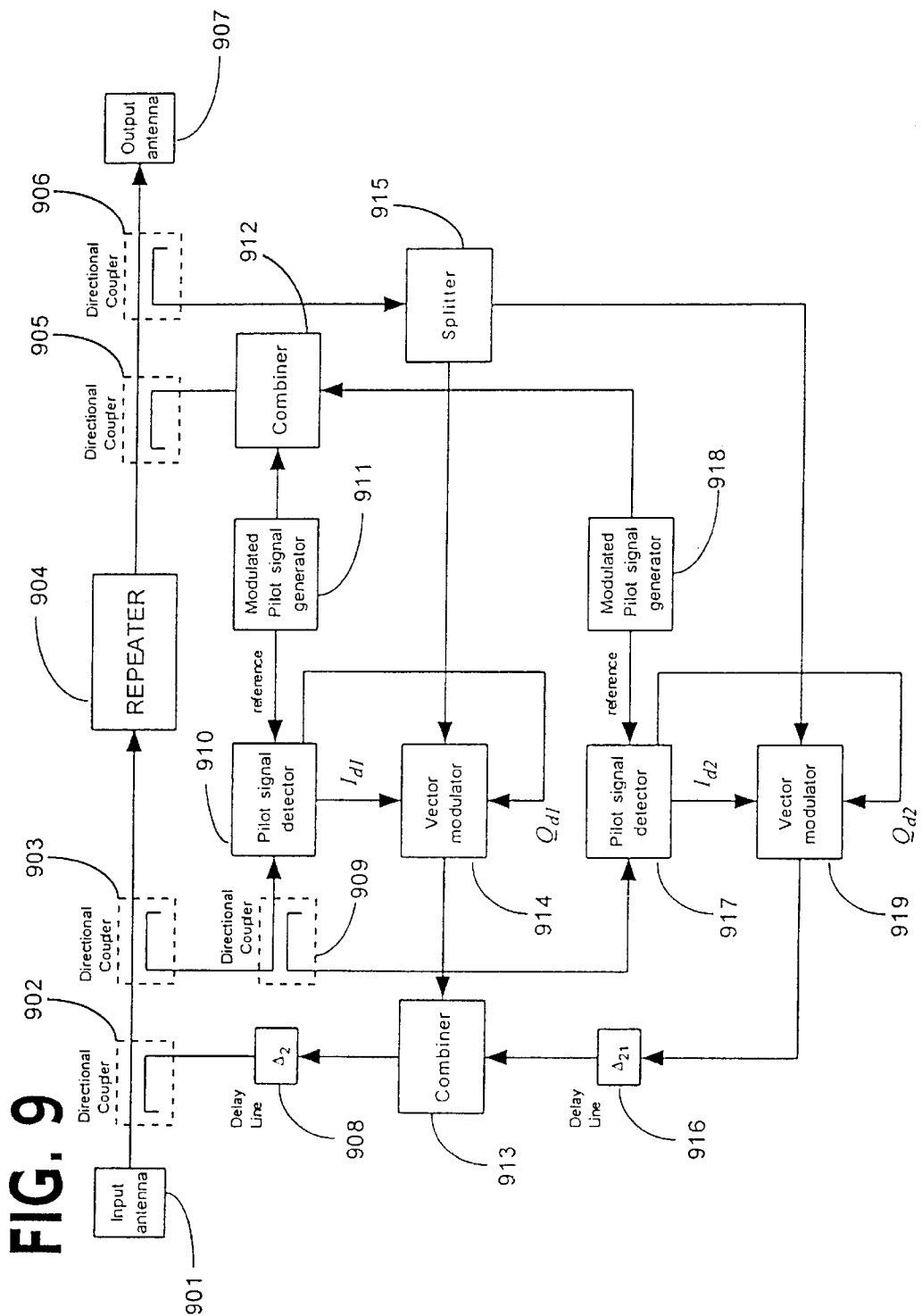
FIG. 9 is a diagram of the preferred embodiment of the coupled interference cancellation system for one direction of a repeater and two pilot signals.

A second preferred embodiment of the CICS of the present invention for one direction of a repeater is diagrammed in FIG. 9. In this embodiment, the system uses two pilot signals at different frequencies in the wide bandwidth of the repeater in order to improve the cancellation achieved across the band. The wideband cellular signals are received at the repeater site by the respective input antenna (901), amplified by the repeater's respective amplifier (904), and retransmitted by the respective output antenna (907). A first modulated pilot signal generator (911) injects a first pilot signal centered at a first frequency ($f_1$) at the repeater output by means of a directional coupler (905) and a second modulated pilot signal generator (918) injects a second pilot signal centered at second frequency ($f_2$) at the repeater output by means of a directional coupler (905), the two pilot signals having been combined using a combiner (912).

A sample of the coupled interference (containing the pilot signals as coupled to the repeater input) is obtained by means of directional couplers (903 and 909) and is provided to a first quadrature pilot signal detector (910). This sample of the coupled interference is also provided to a second quadrature pilot signal detector (917). The first quadrature pilot signal detector (910) extracts the in-phase and quadrature components of the first coupled pilot signal, designated $I_{d1}$ and $Q_{d1}$ in FIG. 9, and the second quadrature pilot signal detector (917) extracts the in-phase and quadrature components of the second coupled pilot signal, designated $I_{d2}$ and $Q_{d2}$ in FIG. 9. The quadrature components $I_{d1}$ and $Q_{d1}$ of the first detected pilot signal govern the operation of a first vector modulator (914), and the quadrature components $I_{d2}$ and $Q_{d2}$ of the second detected pilot signal govern the operation of a second vector modulator (919). A sample of the repeater output communications-plus-pilots signal is obtained by means of a directional coupler (906) and is split into a first and a second sample and distributed to the two vector modulators using a hybrid as a splitter (915). The amplitude and phase of the first sample of the repeater output signal are adjusted by the first vector modulator (914) in response to the control signals $I_{d1}$ and $Q_{d1}$ to produce a first cancellation signal. The amplitude and phase of the second sample of the repeater output signal are adjusted by the second vector modulator (919) in response to the control signals $I_{d2}$ and $Q_{d2}$ and the result is delayed by a small amount, designated $\Delta_{21}$ in FIG. 9, using a first delay line (916) to produce a second cancellation signal. The two cancellation signals are combined using a hybrid as a combiner (913). The total cancellation signal thus obtained is delayed by the amount $\Delta_2$ using a second delay line (908) that is calibrated to match the coupled path delay minus one-half of $\Delta_{21}$, so that the effective delays of the two vector modulator outputs bracket (fall just above and just below in value) the nominal delay of the coupled path. Following this second delay, the resultant combined cancellation signal is applied to the input of the repeater through a directional coupler (902) to cancel the coupled interference. The system thus configured automatically adjusts the two vector modulators' amplitude and phase adjustment factors so that the coupled pilot signal portion of the coupled interference is completely removed, and in doing so the coupled wideband interference signals are substantially reduced.

This concludes the description of the example embodiments. Although the present invention has been described with reference to illustrative embodiments thereof, it should be understood that numerous other modifications and embodiments can be devised by those skilled in the art that will fall within the scope and spirit of the principals of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

I claim:

1. A repeater, comprising:
   a receiving antenna which receives a desired signal at a given frequency;
   a transmitting antenna which transmits an output signal at said given frequency, input signals to the receiving antenna including said desired signal and a coupled interference signal consisting of said output signal delayed in time;
   first means for generating a pilot signal;
   second means for combining said pilot signal with said output signal;
   third means for detecting quadrature components of a portion of said pilot signal included in said coupled interference signal;
   fourth means for sampling said output signal;
   fifth means for adjusting an amplitude and a phase of a sample of said output signal based on the properties of the said portion of the pilot signal included in said coupled interference signal;
   sixth means for delaying the adjusted sample of said output signal; and
   seventh means for combining said adjusted sample of said output signal with said input signal to cancel said coupled interference signal.

2. The repeater of claim 1, wherein each of said means is implemented for both forward and reverse link directions of a bidirectional repeater.

3. The repeater of claim 2, wherein said means for adjusting the amplitude and phase of said output signal is a vector modulator.

4. The repeater of claim 3, wherein a plurality of pilot signals is used in each of said link directions, at different frequencies, said repeater further comprising:
   generating means for generating said pilot signals;
   combining means for combining said each of said pilot signals with said output signal;
   detecting means for detecting quadrature components of a portion of each of said pilot signals included in said coupled interference signal;
   sampling means for sampling said output signal;
   adjusting means for adjusting the amplitude and the phase of a sample of said output signal based on the properties of the said portion of the pilot signal that is included in said coupled interference signal;
   delaying means for delaying the adjusted sample of said output signal; and
   another combining means for combining said adjusted sample of said output signal with said input signal to cancel said coupled interference signal.

5. The repeater of claim 4, further comprising generating means for generating said plurality of pilot signals as sinusoids (carriers) that are modulated by a low-rate square-wave to produce narrowband bi-phase modulated pilot signals.

6. The repeater of any of claims 1 through 5, wherein said means for adjusting the amplitude and the phase of said sampled output signal is a vector modulator circuit controlled by the detected quadrature components of said portion of the pilot signal that is included in said coupled interference signal.

7. The repeater of claim 6, wherein said means for delaying said adjusted sample of said output signal is a section of coaxial cable.

8. The repeater of claim 7, wherein the two phase- and amplitude-adjusted versions of said output signal are delayed by different amounts in the formation of a cancellation signal.

* * * * *